(12) United States Patent
Fischer et al.

(10) Patent No.: US 9,229,223 B2
(45) Date of Patent: Jan. 5, 2016

(54) MULTI-LASER PROJECTION DEVICE AND CORRESPONDING PRODUCTION METHOD

(71) Applicant: Robert Bosch GmbH, Stuttgart (DE)

(72) Inventors: Frank Fischer, Gomaringen (DE); Gael Pilard, Wankheim (DE); Lutz Rauscher, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/470,755

(22) Filed: Aug. 27, 2014

(65) Prior Publication Data

US 2015/0062678 A1    Mar. 5, 2015

(30) Foreign Application Priority Data

Aug. 28, 2013    (DE) .......................... 10 2013 217 095

(51) Int. Cl.
| | |
|---|---|
| G02B 26/08 | (2006.01) |
| G02B 26/10 | (2006.01) |
| G02B 27/10 | (2006.01) |
| H04N 9/31 | (2006.01) |

(52) U.S. Cl.
CPC ............ *G02B 26/10* (2013.01); *G02B 26/0875* (2013.01); *G02B 26/101* (2013.01); *G02B 27/1006* (2013.01); *H04N 9/3129* (2013.01); *H04N 9/3164* (2013.01)

(58) Field of Classification Search
CPC .... G02B 26/10; G02B 26/0875; G02B 3/005; G02B 21/367; G02B 27/1006; G02B 27/283; G02B 27/0961; G02B 27/30; G02B 19/0057; G02B 19/0052; H04N 9/3129
USPC ................................ 359/201.1, 641; 345/690
See application file for complete search history.

(56) References Cited

U.S. PATENT DOCUMENTS

| | | | | |
|---|---|---|---|---|
| 2011/0037953 A1* | 2/2011 | Nizani | ................... | G02B 3/005 353/38 |
| 2013/0076800 A1* | 3/2013 | Hatagi | ................ | H04N 9/3129 345/690 |

FOREIGN PATENT DOCUMENTS

DE    10 2007 042 720    3/2009

* cited by examiner

*Primary Examiner* — Euncha Cherry
(74) *Attorney, Agent, or Firm* — Kenyon & Kenyon LLP

(57) ABSTRACT

A multi-laser projection device includes: a plurality of first assemblies, each including a fixed assemblage of a respective laser diode and an associated first collimator lens; a second assembly that forms a fixed assemblage of a beam combiner and a respective second collimator lens that is fastened on an entry surface of the beam combiner and that appertains to a respective laser diode; and a deflection unit. The plurality of first assemblies, the second assembly, and the deflection unit are mounted in a common housing so as to be adjusted to one another.

10 Claims, 3 Drawing Sheets

MULTI-LASER PROJECTION DEVICE AND CORRESPONDING PRODUCTION METHOD

BACKGROUND OF THE INVENTION

1. Field of the Invention

The present invention relates to a multi-laser projection device and to a corresponding production method.

2. Description of the Related Art

Multi-laser projection devices, having for example three laser diodes having different wavelengths (red, green, blue), are known, for example, from published German patent application document DE 10 2007 042 720 A1.

FIG. 5 is a schematic cross-sectional representation of a multi-laser projection device for the explanation of the problem on which the present invention is based.

In FIG. 5, reference character 9 designates a multi-laser projection device that has three laser diodes LD1, LD2, LD3 for producing light having different wavelengths (red, green, blue).

Laser diodes LD1, LD2, LD3 are standardly installed in TO housings, but in principle can also be processed as blank chips. The direction of the light paths formed by laser diodes LD1, LD2, LD3 are shown in dashed lines.

The divergent light emitted from laser diodes LD1, LD2, LD3 is collimated by a respective discrete first collimator lens 1, 2, 3 along a first collimation axis, and is subsequently collimated, using a respective second discrete collimator lens 4, 5, 6, in a second collimation axis situated perpendicular to the first collimation axis.

The light collimated in this way of laser diodes LD1, LD2, LD3 then passes through an entry surface E into a beam combiner 7, where it is precisely superposed. Finally, the superposed light exits through an exit surface A from beam combiner 7 into a deflection unit (scanner) 8, which moves the laser beam formed in this way over a projection surface (not shown).

The components of multi-laser projection device 9 are mounted in a common housing 90.

For the assembly of multi-laser projection device 9 shown in FIG. 5, first the components LD1, LD2, LD3, 1, 2, 3, 4, 5, 6, and 7 are individually adjusted and fixed relative to one another. This standardly takes place during active operation of the respective laser diode LD1, LD2, LD3 in order to make it possible to directly observe the collimation result of collimator lenses 1, 2, 3, 4, 5, 6. The finally adjusted and fixed assembly 10 is then adjusted relative to pre-mounted deflection unit 8, and is fixed in housing 90.

In this assembly technique, therefore, the optical components of multi-laser projection device 9 are individually adjusted in a common assemblage of assembly 10, which is expensive.

FIG. 6 is a schematic cross-sectional representation of a further multi-laser projection device for the explanation of the problem on which the present invention is based.

In FIG. 6, the multi-laser projection device is designated 9'. In the assembly technique illustrated in FIG. 6, individual laser diodes LD1, LD2, LD3 are each actively adjusted with their respective first collimator lens 1, 2, 3 and their respective second collimator lens 4, 5, 6, and are pre-mounted in a respective assembly 11a, 11b, 11c.

Subsequently, each assembly 11a, 11b, 11c is actively adjusted relative to beam combiner 7, i.e. while in laser emission operation, and is fixed in housing 90 of multi-laser projection device 9'.

In the two assembly techniques described with reference to FIGS. 5 and 6, therefore, for each laser diode LD1, LD2, LD3 a plurality of optical components must be actively adjusted, which is the cause of a large part of the production expense of multi-laser projection device 9 or 9'.

BRIEF SUMMARY OF THE INVENTION

Through the multi-laser projection device according to the present invention and the corresponding production method, the number of components and the adjustment steps can be reduced, resulting in significant cost advantages.

The idea on which the present invention is based is to divide the production process into a plurality of useful steps.

The production method, or the corresponding multi-laser projection device, have the advantage that not all the collimator lenses have to be actively adjusted, but rather only the first respective collimator lens to the associated laser diode, and then the assemblage of first collimator lens and associated laser diode relative to the beam combiner with the respective second collimator lens attached thereon.

According to a preferred specific embodiment, the second collimator lenses are individually fastened on the entry surface. This increases flexibility.

According to a further preferred specific embodiment, the second collimator lenses are glued directly onto the entry surface. This has a space-saving effect.

According to a further preferred specific embodiment, the second collimator lenses are formed as a contiguous third assembly fastened on the entry surface. If all second collimator lenses are formed in a single lens functional block, they can be connected in common to the beam combiner, further reducing production outlay.

According to a further preferred specific embodiment, the third assembly is glued directly onto the entry surface. This has a space-saving effect.

According to a further preferred specific embodiment, the third assembly is made of glass or plastic.

According to a further preferred specific embodiment, the third assembly has plano-concave and/or plano-convex second collimator lenses.

According to a further preferred specific embodiment, three laser diodes are provided in the colors red, green, and blue.

According to a further preferred specific embodiment, the first collimator lenses and the second collimator lenses have collimation axes that stand perpendicular to one another.

DETAILED DESCRIPTION OF THE INVENTION

Figure 1:
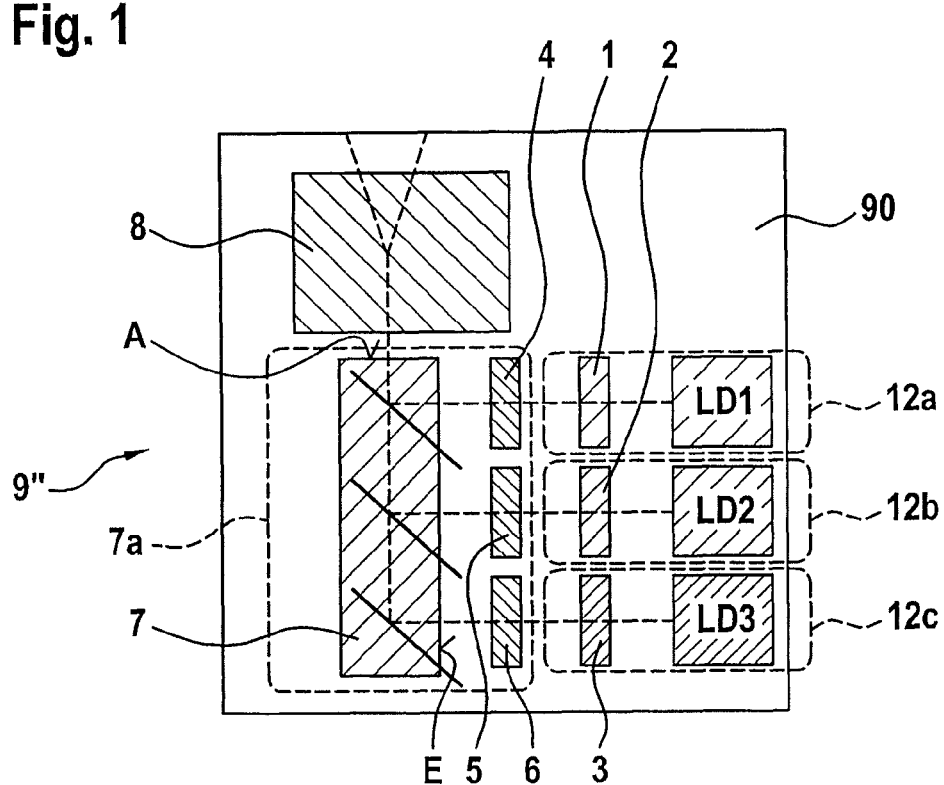
FIG. 1 shows a schematic cross-sectional representation of a multi-laser projection device according to a first specific embodiment of the present invention.

In the Figures, identical reference characters designate identical or functionally identical elements.

FIG. 1 is a schematic cross-sectional representation of a multi-laser projection device according to a first specific embodiment of the present invention.

In a first step, beam combiner 7 of multi-LED projection device 9" is connected, mediately or immediately, to the respective second collimator lens 4, 5, 6, or a lens functional block formed therefrom, in a purely mechanical adjustment and assembly step, without an expensive active adjustment taking place. Here, surface E of beam combiner 7 can act as defined mechanical connection surface.

Assembly 7a of beam combiner 7 and second collimation lenses 4, 5, 6 is then, in the next step, adjusted relative to deflection unit 8 pre-mounted in common housing 90, and is fixed in common housing 90. This assembly step can be carried out either actively, with an adjustment laser, or also passively.

In a further step, assemblies 12a, 12b, 12c, having a respective laser diode LD1, LD2, LD3 and a respective first collimator lens 1, 2, 3, are then formed and actively adjusted.

Finally, assemblies 12a, 12b, 12c are actively adjusted relative to assembly 7a having beam combiner 7 and second collimator lenses 4, 5, 6, and are fixed in housing 90 of multi-laser projection device 9".

Figure 2:
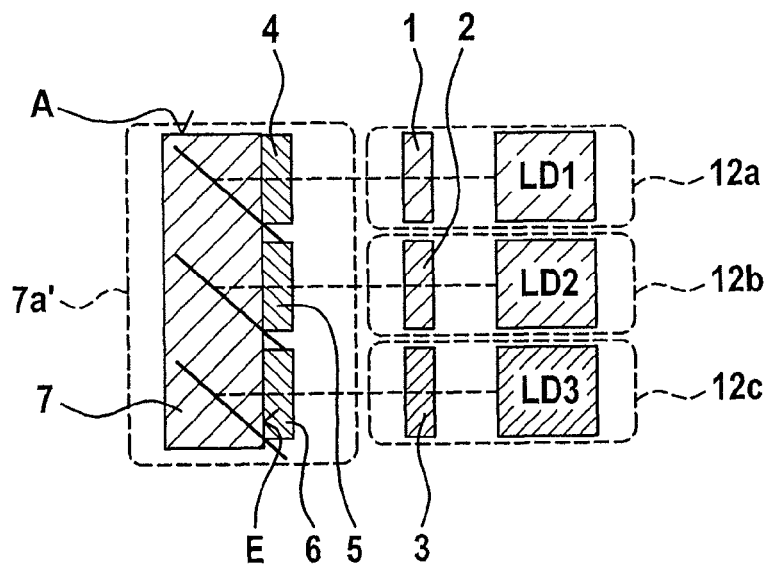
FIG. 2 shows a schematic cross-sectional representation of a segment of a multi-laser projection device according to a second specific embodiment of the present invention.

FIG. 2 is a schematic cross-sectional representation of a segment of a multi-laser projection device according to a second specific embodiment of the present invention.

In the specific embodiment described above according to FIG. 1, a mechanical connection is formed at entry surface E of beam combiner 7 with respective individual second collimator lens 4, 5, 6, the connection being formed mediately, e.g. via a respective interposer.

In the second specific embodiment according to FIG. 2, in assembly 7a' having beam combiner 7 and second collimator lenses 4, 5, 6 it can be seen that second collimator lenses 4, 5, 6 are glued directly onto entry surface E of beam combiner 7.

In this approach as well, surface E of beam combiner 7 can act as defined mechanical connecting surface.

Figure 3:
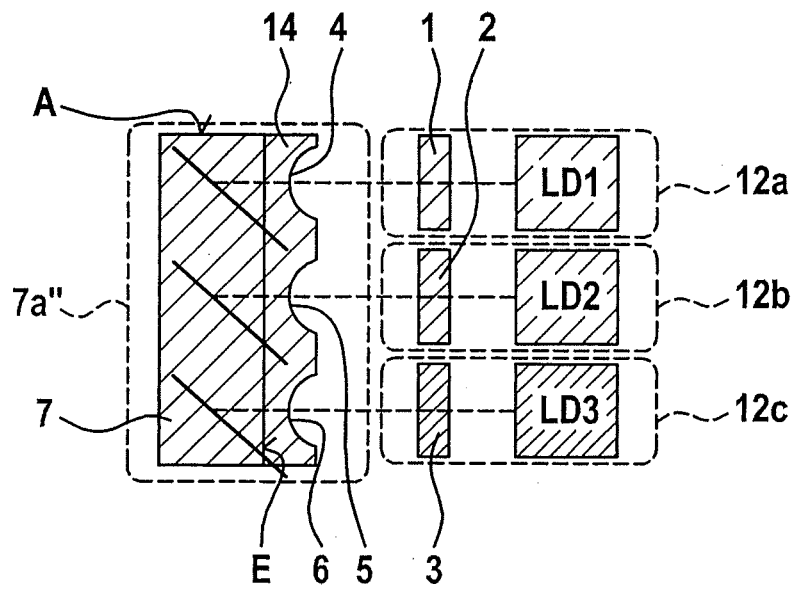
FIG. 3 shows a schematic cross-sectional representation of a segment of a multi-laser projection device according to a third specific embodiment of the present invention.

FIG. 3 is a schematic cross-sectional representation of a segment of a multi-laser projection device according to a third specific embodiment of the present invention.

In the third specific embodiment according to FIG. 3, the assembly of beam combiner 7 and respective second collimator lens 4, 5, 6 is designated with reference character 7a". In this exemplary embodiment, second collimator lenses 4, 5, 6 are combined to form a single lens functional block 14, which can be formed for example from glass or plastic. Here, a plano-concave lens shape of second collimator lenses 4, 5, 6 is shown. The assembly in the form of lens functional block 14 can be glued directly onto entry surface E of beam combiner 7. After mounting of assembly 7a" in housing 90 of multi-laser projection device 9", partly assembled laser modules 12a, 12b, 12c can be adjusted and fixed in housing 90. The degree of freedom is adequate to achieve a good beam quality.

Figure 4:
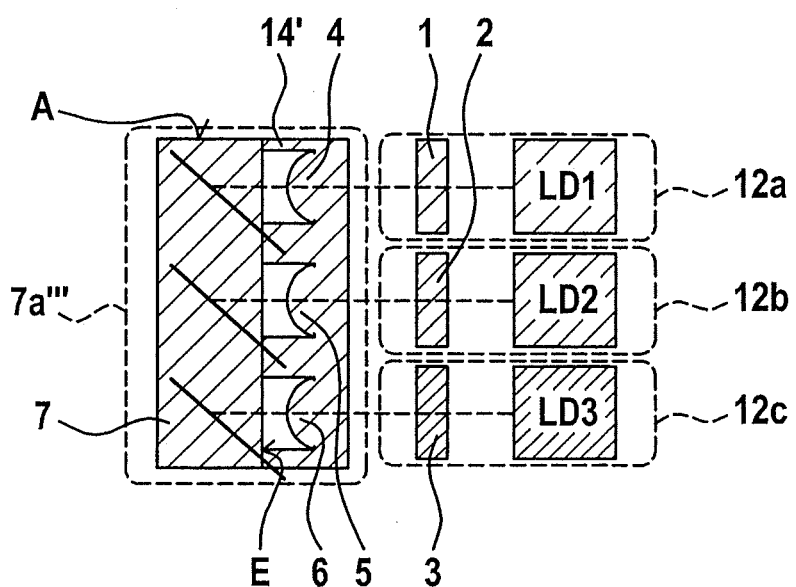
FIG. 4 shows a schematic cross-sectional representation of a segment of a multi-laser projection device according to a fourth specific embodiment of the present invention.
Figure 5:
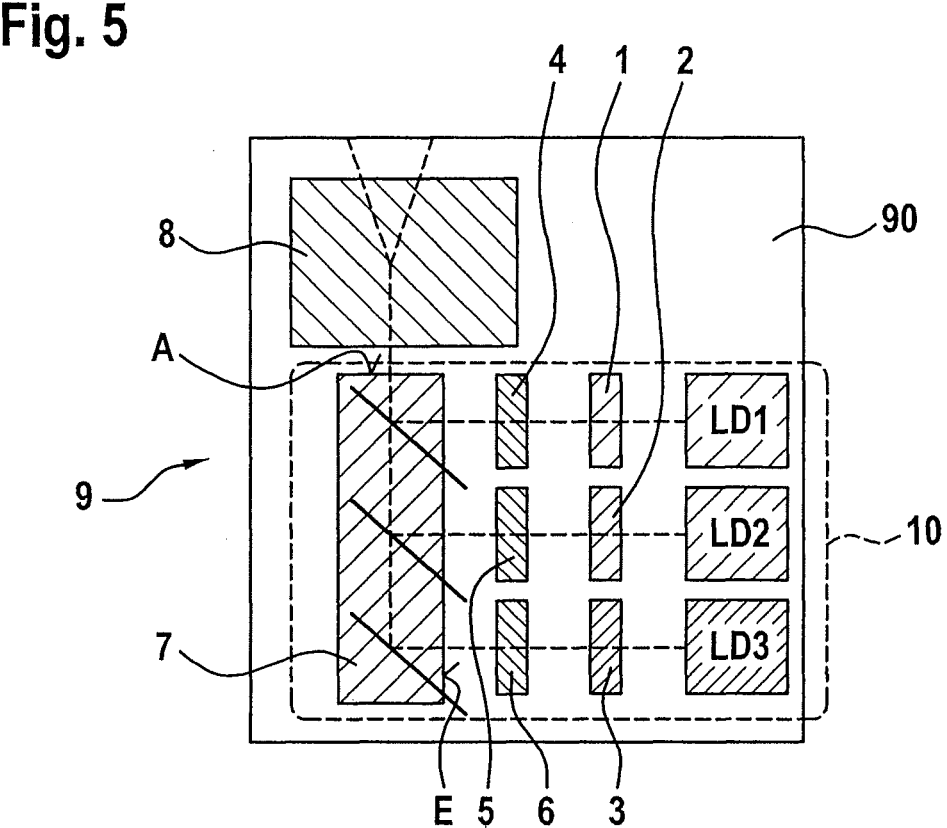
FIG. 5 shows a schematic cross-sectional representation of a multi-laser projection device for the explanation of the problem on which the present invention is based.
Figure 6:
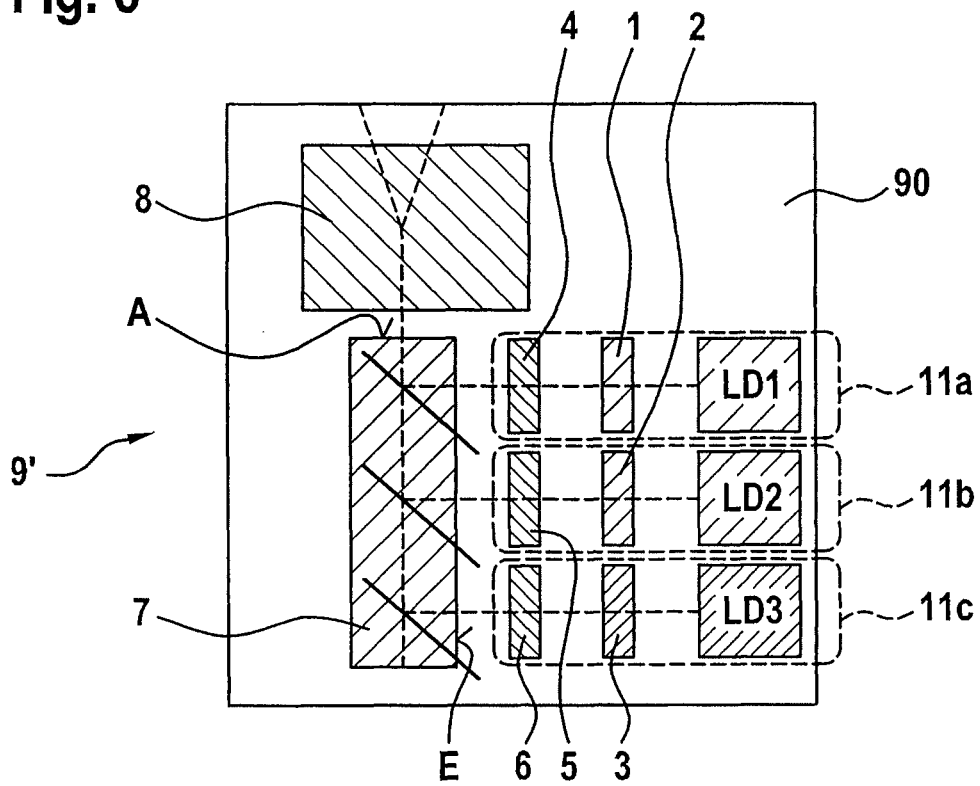
FIG. 6 shows a schematic cross-sectional representation of a further multi-laser projection device for the explanation of the problem on which the present invention is based.

FIG. 4 shows a schematic cross-sectional representation of a segment of a multi-laser projection device according to a fourth specific embodiment of the present invention.

In the fourth specific embodiment according to FIG. 4, instead of the plano-concave lens shape of FIG. 3, a plano-convex lens shape of second collimator lenses 4, 5, 6 is provided.

In this fourth specific embodiment as well, from second collimator lenses 4, 5, 6 a common assembly 14' is formed that can be glued onto entry surface E of beam combiner 7 in order to form assembly 7a'''.

Although the present invention has been completely described above on the basis of preferred exemplary embodiments, it is not limited thereto, but rather can be modified in many ways.

In particular, the shapes of the second collimator lenses are named only as examples, and can in principle be shaped arbitrarily as long as they can be connected directly to the beam combiner without active adjustment. The number of laser diodes is also not limited to the indicated number. Finally, it is possible to provide further passive or active components in the beam path of the multi-laser projection device.

What is claimed is:

1. A multi-laser projection device, comprising:
   a plurality of first assemblies each including a fixed assemblage of a respective laser diode and an associated first collimator lens;
   a second assembly including a fixed assemblage of a beam combiner and second collimator lenses, wherein each respective second collimator lens (i) is fastened on an entry surface of the beam combiner and (ii) appertains to a respective laser diode; and
   a deflection unit;
   wherein the plurality of first assemblies, the second assembly, and the deflection unit are mounted in a common housing so as to be adjusted to one another.

2. The multi-laser projection device as recited in claim 1, wherein the second collimator lenses are fastened individually on the entry surface.

3. The multi-laser projection device as recited in claim 2, wherein the second collimator lenses are glued directly onto the entry surface.

4. The multi-laser projection device as recited in claim 1, wherein the second collimator lenses are formed as a contiguous third assembly which is fastened on the entry surface.

5. The multi-laser projection device as recited in claim 4, wherein the third assembly is glued directly onto the entry surface.

6. The multi-laser projection device as recited in claim 5, wherein the third assembly is formed from one of glass or plastic.

7. The multi-laser projection device as recited in claim 5, wherein the second collimator lenses of the third assembly are at least one of plano-concave collimator lenses and plano-convex collimator lenses.

8. The multi-laser projection device as recited in claim 5, wherein red, green, and blue laser diodes are provided.

9. The multi-laser projection device as recited in claim 2, wherein the first collimator lenses have first collimation axes and the second collimator lenses have second collimation axes which are perpendicular to the first collimation axes.

10. A production method for a multi-laser projection device, comprising:
    producing a plurality of first assemblies each including a fixed assemblage of a respective laser diode and an associated first collimator lens;
    producing a second assembly including a fixed assemblage of a beam combiner and second collimator lenses, wherein each respective second collimator lens (i) is fastened on an entry surface of the beam combiner and (ii) appertains to a respective laser diode;
    providing a deflection unit; and mounting the plurality of first assemblies, the second assembly, and the deflection unit in a common housing so as to be adjusted to one another.

\* \* \* \* \*